US010001075B2

(12) United States Patent
Tansley

(10) Patent No.: US 10,001,075 B2
(45) Date of Patent: Jun. 19, 2018

(54) INTERNAL COMBUSTION ENGINE

(71) Applicant: James Royston Tansley, Derby (GB)

(72) Inventor: James Royston Tansley, Derby (GB)

( * ) Notice: Subject to any disclaimer, the term of this patent is extended or adjusted under 35 U.S.C. 154(b) by 0 days. days.

(21) Appl. No.: 15/035,906

(22) PCT Filed: Nov. 11, 2014

(86) PCT No.: PCT/GB2014/000460
§ 371 (c)(1),
(2) Date: May 11, 2016

(87) PCT Pub. No.: WO2015/071625
PCT Pub. Date: May 21, 2015

(65) Prior Publication Data
US 2016/0298560 A1 Oct. 13, 2016

(30) Foreign Application Priority Data

Nov. 12, 2013 (GB) .................................. 1319903.9

(51) Int. Cl.
| F02D 41/12 | (2006.01) |
| F02B 21/00 | (2006.01) |
| F02D 13/02 | (2006.01) |
| F02D 17/02 | (2006.01) |
| F02D 9/08 | (2006.01) |

(Continued)

(52) U.S. Cl.
CPC .............. *F02D 41/12* (2013.01); *F02B 21/00* (2013.01); *F02D 9/08* (2013.01); *F02D 13/0276* (2013.01); *F02D 17/023* (2013.01); *F02D 41/0005* (2013.01); *F16H 61/0025* (2013.01); *F02D 2200/101* (2013.01); *Y02T 10/18* (2013.01)

(58) Field of Classification Search
CPC ........ F02D 41/12; F02D 41/0005; F02D 9/08; F02D 13/0276; F02D 17/023; F02D 2200/101; F16H 61/0025; F02B 21/00; Y02T 10/18; F02P 13/00; H01T 13/40
USPC ................ 123/182.1, 151, 152, 169 V, 143 B
See application file for complete search history.

(56) References Cited

U.S. PATENT DOCUMENTS 1,492,007 A * 4/1924 Wayte ..................... H01T 13/14
123/169 V
2,490,646 A * 12/1949 Murphy ................. H01T 13/14
123/169 V (Continued)

FOREIGN PATENT DOCUMENTS

FR 2 831 609 5/2003
GB 2 402 169 A 12/2004

*Primary Examiner* — Hai Huynh
(74) *Attorney, Agent, or Firm* — Harrington & Smith

(57) ABSTRACT

An internal combustion engine including a combustion chamber; a compressed gas valve wherein the compressed gas valve is arranged to enable compressed gas to be extracted from the internal combustion engine and used to provide power for mechanical functions: and a controller, wherein the controller is configured to receive a signal indicative of the configuration of the internal combustion engine and cause the compressed gas valve to be opened in response to a signal indicating at least one of that the internal combustion engine is decelerating and a throttle is closed to enable compressed gas to be extracted from the internal combustion engine via the compressed gas valve.

17 Claims, 3 Drawing Sheets

Figure 1:
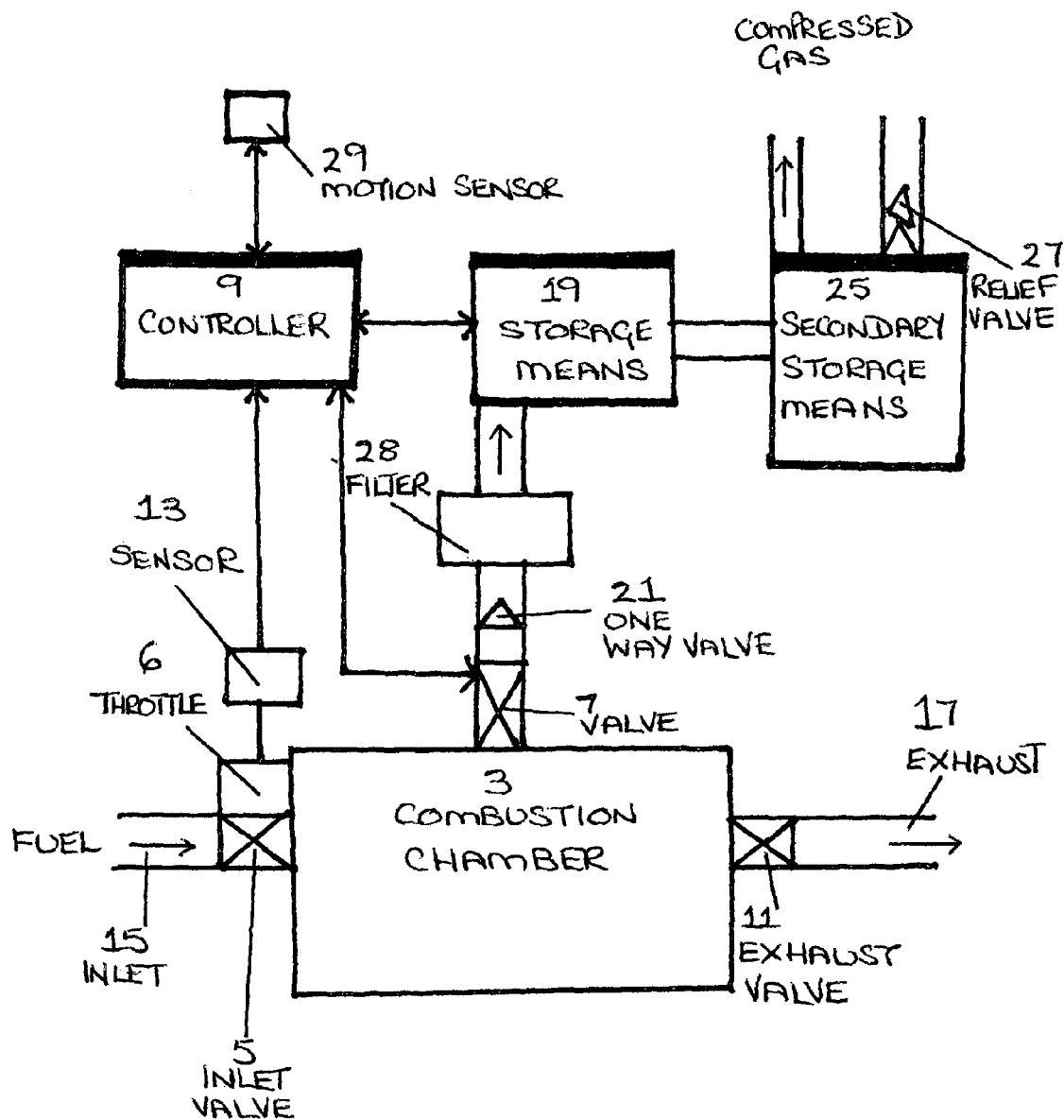

(51) Int. Cl.
*F02D 41/00* (2006.01)
*F16H 61/00* (2006.01)

(56) References Cited

U.S. PATENT DOCUMENTS

| | | | | |
|---|---|---|---|---|
| 4,326,145 A | * | 4/1982 | Foster | F02N 19/004 |
| | | | | 123/182.1 |
| 5,245,963 A | * | 9/1993 | Sabol | F02B 19/12 |
| | | | | 123/169 C |
| 6,223,846 B1 | | 5/2001 | Schechter | 180/165 |
| 6,240,888 B1 | * | 6/2001 | Pilney | F01L 13/08 |
| | | | | 123/169 V |
| 6,382,159 B1 | * | 5/2002 | Shifflette | H01T 13/08 |
| | | | | 123/169 R |
| 7,073,471 B1 | * | 7/2006 | Mead | H01T 13/40 |
| | | | | 123/151 |
| 2005/0182553 A1 | | 8/2005 | Miller et al. | 701/103 |
| 2010/0270097 A1 | | 10/2010 | Prakash et al. | 180/165 |
| 2010/0307440 A1 | | 12/2010 | Ma et al. | 123/179.3 |
| 2010/0314186 A1 | | 12/2010 | Ma | 180/165 |
| 2011/0023509 A1 | | 2/2011 | Gardiner | 62/133 |
| 2012/0216779 A1 | | 8/2012 | Kawano et al. | 123/447 |
| 2012/0324884 A1 | | 12/2012 | Reuss et al. | 60/613 |
| 2016/0252004 A1 | * | 9/2016 | Koszewnik | F02B 11/02 |
| | | | | 123/51 B |

* cited by examiner

INTERNAL COMBUSTION ENGINE

TECHNOLOGICAL FIELD

Embodiments of the present invention relate to an internal combustion engine. In particular, they relate to an internal combustion engine which enables unused compressed gas to be harnessed and used to provide power to mechanical functions.

BACKGROUND

Internal combustion engines, such as four stroke engines, which generate power from the combustion of fuel are well known. The energy provided by such engines may be used in a wide range of applications such as motor vehicles.

Such engines are not completely efficient so that not all of the energy provided by the engines is used to provide useful work. It is beneficial to provide internal combustion engines which enable energy, which would otherwise be wasted, to be harnessed and used for any suitable purpose.

BRIEF SUMMARY

According to various, but not necessarily all examples of the disclosure there may be provided an internal combustion engine comprising: a combustion chamber; a compressed gas valve wherein the compressed gas valve is arranged to enable compressed gas to be extracted from the internal combustion engine and used to provide power for mechanical functions: and a controller, wherein the controller is configured to receive a signal indicative of a configuration of the internal combustion engine and cause the compressed gas valve to be opened in response to a signal indicating at least one of that the internal combustion engine is decelerating or a throttle is closed to enable compressed gas to be extracted from the internal combustion engine via the compressed gas valve.

In some examples the internal combustion engine may further comprise an inlet valve.

In some examples the internal combustion engine may further comprise an outlet valve configured to enable exhaust gases to be expelled from the combustion chamber.

In some examples the compressed gas valve may be configured to enable compressed gas to be extracted from the combustion chamber. The compressed gas valve may be provided in a spark plug.

In some examples the compressed gas valve may be configured to enable compressed gas to be extracted from an exhaust outlet.

In some examples the controller may be configured to cause the compressed gas valve to be opened in response to a signal indicating that the throttle valve is closed.

In some examples the controller may be configured to cause the compressed gas valve to be opened in response to a signal indicating that a vehicle powered by the internal combustion engine is decelerating.

In some examples the internal combustion engine may further comprise storage means configured to store the extracted compressed gas. The storage means may comprise a relief valve.

In some examples the controller may be configured to cause the compressed gas valve to be closed in response to a signal indicating that the storage means is full.

In some examples the configuration of the compressed gas valve may be controlled using a solenoid. In some examples the configuration of the compressed gas valve may be controlled using a pneumatic system. In some examples the configuration of the compressed gas valve may be controlled using a servo motor.

In some examples the extracted compressed gas may be used to power a gear shift system.

According to various, but not necessarily all examples of the disclosure there may be provided a combustion chamber for an internal combustion engine, the combustion chamber comprising: a compressed gas valve wherein the compressed gas valve is arranged to enable compressed gas to be extracted from the internal combustion engine and used to provide power for mechanical functions: and wherein the compressed gas valve is configured to be opened in response to a signal indicating at least one of that the internal combustion engine is decelerating or a throttle is closed.

According to various, but not necessarily all examples of the disclosure there may be provided a spark plug for an internal combustion engine wherein the spark plug comprises a valve configured to enable compressed gas to be extracted from the internal combustion engine.

In some examples the valve in the spark plug may be configured to enable the compressed gases to be extracted when the engine is decelerating.

The internal combustion engine may be for powering a motor vehicle such as a motorbike or a car.

BRIEF DESCRIPTION

Figure 2:
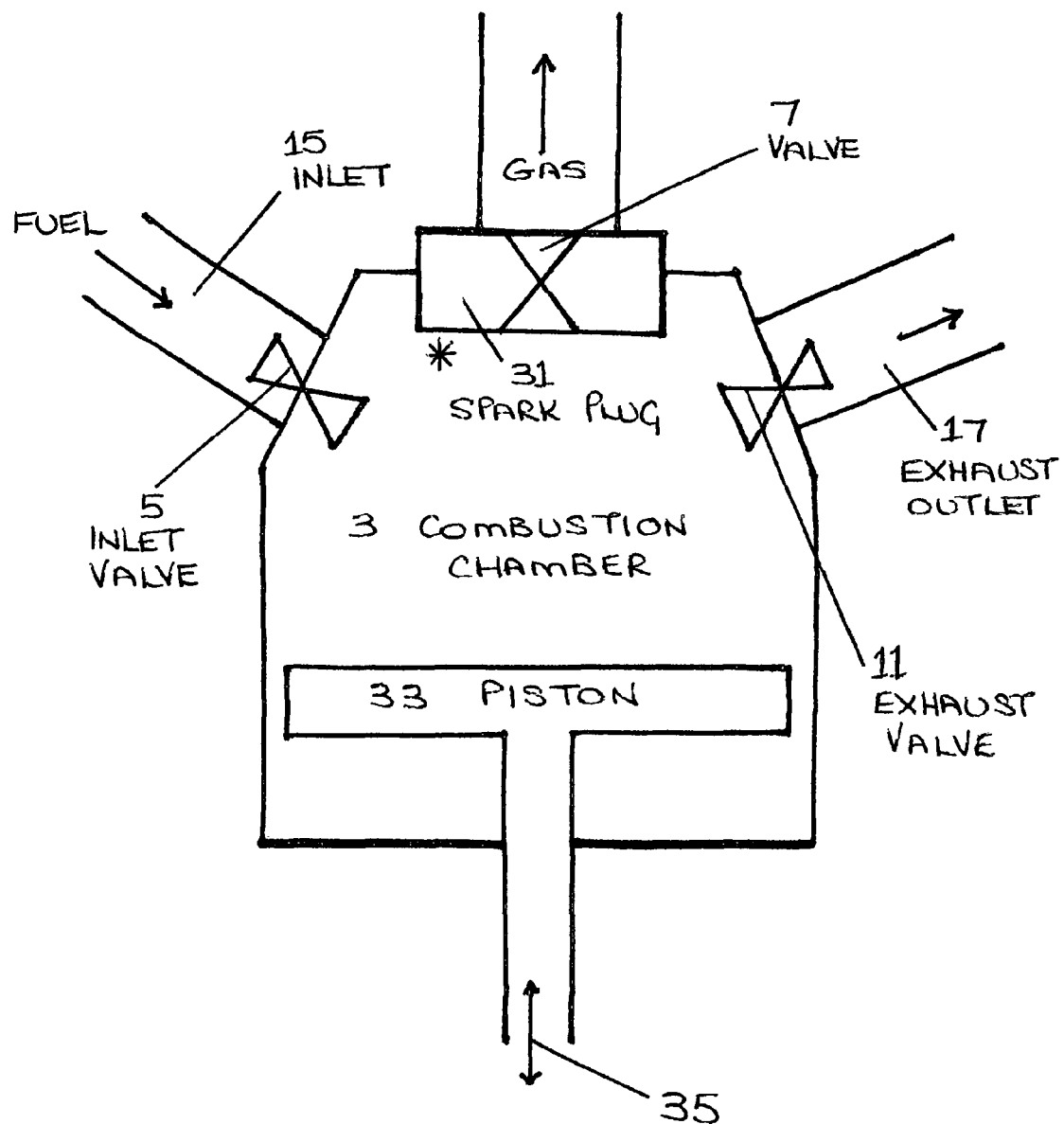

For a better understanding of various examples that are useful for understanding the detailed description, reference will now be made by way of example only to the accompanying drawings in which:

FIG. 1 schematically illustrates an internal combustion engine;

FIG. 2 schematically illustrates an example combustion chamber; and

Figure 3:
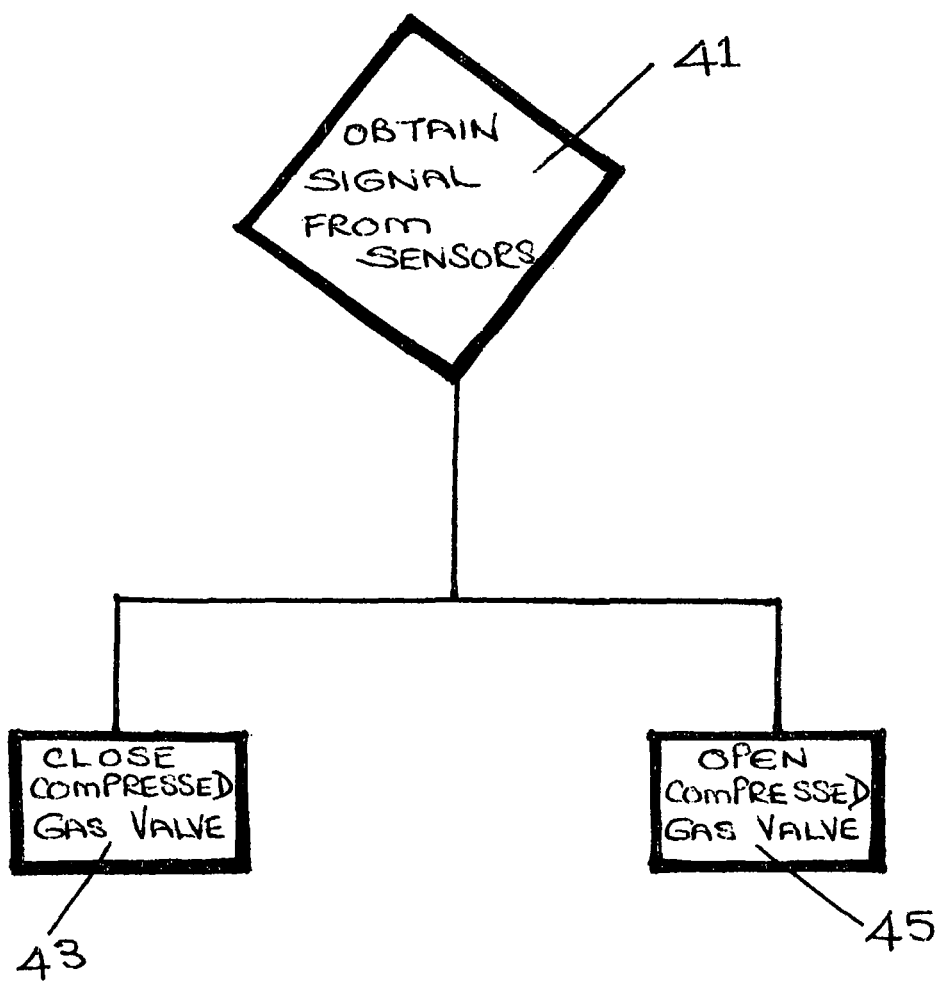

FIG. 3 schematically illustrates a method which may be implemented using the internal combustion engine.

DETAILED DESCRIPTION

The Figures illustrate an internal combustion engine 1 comprising: a combustion chamber 3; a compressed gas valve 7 wherein the compressed gas valve 7 is arranged to enable compressed gas to be extracted from the internal combustion engine 1 and used to provide power for mechanical functions; and a controller 9, wherein the controller 9 is configured to receive a signal indicative of a configuration of the internal combustion engine 1 and cause the compressed gas valve 7 to be opened in response to a signal indicating at least one of that the internal combustion engine 1 is decelerating or a throttle 6 is closed to enable compressed gas to be extracted from the internal combustion engine 1 via the compressed gas valve 7.

FIG. 1 schematically, illustrates an internal combustion engine 1 according to examples of the disclosure. Only features which are referred to in the following description, are illustrated in FIG. 1. It is to be appreciated that other components may be included within the internal combustion engine 1.

The internal combustion engine 1 may comprise any type of internal combustion engine such as a four stroke or a two stroke engine or any other suitable engine type. In some examples the internal combustion engine 1 could be used in a vehicle such as a motorbike, car, van or any other suitable type of vehicle. However it is to be appreciated that the internal combustion engine could be used for any other suitable purpose.

The example internal combustion engine 1 of FIG. 1 comprises a combustion chamber 3. The combustion chamber 3 may be where the ignition and combustion of fuel which powers the engine 1 occurs. The fuel may be any suitable type of fuel such as petrol, or diesel or any other liquid or gaseous fuel.

Fuel may be provided to the combustion chamber 3 via an inlet 15. The inlet 15 may comprise a throttle 6 and an inlet valve 5. Fuel may be provided to the combustion chamber 3 via the throttle 6 and inlet valve 5. The throttle 6 and inlet valve 5 may be arranged to enable the flow of fuel into the combustion chamber 3 to be controlled. For example the throttle position 6 may be controlled to be opened and closed by a user of the engine 1. For example, where the engine 1 is used in a motor vehicle such as a car the driver of the car controls the position of the throttle 6 by pressing the accelerator pedal.

When the throttle 6 is open this may allow fuel to be provided into the combustion chamber 3. If the throttle 6 is closed, for example if the driver of a vehicle lifts off the accelerator, then fuel may be prevented from entering the combustion chamber 3. This would stop the combustion processes and causes the engine 1 to decelerate.

The example internal combustion engine 1 of FIG. 1 also comprises a sensor 13. The sensor 13 may be a throttle position sensor (TPS). The sensor 13 may be configured to detect the position of the throttle 6. For example the sensor 13 may be configured to detect whether the throttle 6 is open or closed. In some examples the sensor 13 may be configured to detect whether the throttle 6 is partially open. The sensor 13 may comprise any means which may be used to detect whether or not the throttle 6 is open or closed, for example the sensor 13 may comprise a mechanical sensor, a resistive or capacitive sensor, an optical sensor, a Hall Effect sensor or any other suitable means. The sensor 13 may be configured to provide a signal indicative of the position of the throttle 6 to a controller 9.

The exhaust gases may be expelled from the combustion chamber 3 via an exhaust outlet 17. An exhaust valve 11 may be provided to control the flow of exhaust gases through the exhaust outlet 17. The exhaust valve 11 may be configured to be closed at appropriate points during the combustion cycle of the engine 1 to enable efficient combustion of the fuel.

In the example of FIG. 1 the internal combustion engine 1 also comprises further valve 7. The further valve 7 may be provided in addition to any inlet valves 5 and exhaust valves 11. The further valve 7 may be compressed gas valve 7. The compressed gas valve 7 may be configured to enable compressed gas to be extracted from the internal combustion engine 1. In some examples the compressed gas valve 7 may be configured to enable the compressed gas to be extracted from the combustion chamber 3. In other examples the compressed gas valve 7 may be configured to enable the compressed gas to be extracted from other parts of the internal combustion engine 1 such as the exhaust outlet 17.

The compressed gas valve 7 may be configured to enable compressed gas to be extracted from the internal combustion engine 1 when the engine 1 is decelerating. The compressed gas valve 7 may be configured to enable compressed gas to be extracted from the internal combustion engine 1 when combustion has ceased. The compressed gas valve 7 may be closed during the combustion process to prevent unwanted gases from being extracted from the engine 1 and to enable the combustion to take place efficiently.

The compressed gas valve 7 may be arranged to be controlled by the controller 9. The compressed gas valve 7 may be arranged to be opened and/or closed in response to a control signal received from the controller 9. Any suitable system such as a solenoid, a pneumatic system or a servo motor or any other suitable mechanism may be used to control the configuration of the compressed gas valve 7.

The example internal combustion engine 1 of FIG. 1 also comprises a storage means 19. The storage means 19 may be configured to store the compressed gas which has been extracted via the compressed gas valve 7. A one way valve 21 may be provided between the storage means 19 and the combustion chamber 3. This may prevent compressed gas from flowing back into the combustion chamber 3.

In some examples a secondary storage means 25 may be provided. The secondary storage means 25 may also be configured to store compressed gas. The secondary storage means 25 may be coupled to the storage means 19 so that compressed gas may be provided from the storage means 19 to the secondary storage means 25. The compressed gas can then be provided from the secondary storage means 25 to mechanical functions as and when it is needed.

It is to be appreciated that in some examples the internal combustion engine 1 need not have a storage means 19 and secondary storage means 25 and that in such examples the extracted compressed gas may be provided directly to the mechanical functions. It is to be appreciated that in some examples the internal combustion engine 1 need not have a secondary storage means 25 and that in such examples the extracted compressed gas may be provided from the storage means 19 directly to the mechanical functions.

In the example of FIG. 1 the secondary storage means 25 comprises a relief valve 27. The relief valve 27 may be configured to control the pressure within the secondary storage means 25. In some examples a relief valve may also be provided in the storage means 19.

In some examples the storage means 19 may be configured to provide a control signal to the controller 9. The control signal may provide an indication of the remaining capacity within the storage means 19. For example, it may provide an indication as to whether or not the storage means 19 is full. In some examples the secondary storage means 25 may be configured to provide a control signal which may provide an indication as to whether or not the secondary storage means 25 is full.

In the example of FIG. 1 the internal combustion engine 1 comprises a filter 28. The filter 28 may be positioned between the combustion chamber 3 and the storage means 19. In the particular example of FIG. 1 the filter 28 is positioned between the one way valve 21 and the storage means 19. The filter 28 may be configured to remove contaminants such as oil or fuel from the compressed gas. In some examples the filter 28 may be provided between the storage means 19 and the secondary storage means 25. It is to be appreciated that any number of filters 28 may be provided at any appropriate location in the combustion engine 1.

In some examples one or both of the storage means 19 and the secondary storage means 25 may comprise a condensation trap. The condensation trap may be configured to collect liquids such as water which may condense out of the compressed gas as it cools.

The example internal combustion engine 1 of FIG. 1 also comprises a controller 9. The controller 9 may comprise an electronic controller 9. In some examples the controller 9 may comprise one or more processors and one or more memories. The one or more processors may be operable to write to and read from the one or more memories. The one or more memories may be operable to store computer program instructions for controlling the controller 9 and the internal combustion engine 1.

The controller 9 may be operable to control the internal combustion engine 1. The controller 9 may be configured to control the configuration of the compressed gas valve 7. In particular the controller 9 may be configured to control when the compressed gas valve 7 is opened and closed.

The controller 9 may be configured to receive an input signal from the throttle position sensor 13. In such examples the input signal provides an indication of the configuration of the throttle 6. In particular the input signal may provide an indication of whether the throttle 6 is open or closed or if it is partially open. In response to the input signal received from the sensor 13, the controller 9 may be configured to send a control signal to the compressed gas valve 7. The control signal may cause the compressed gas valve 7 to be opened and closed in dependence upon the position of the throttle 6.

In the example of FIG. 1 the controller 9 may also be configured to receive an input control signal from a motion sensor 29. The motion sensor 29 may be configured to detect to motion of a vehicle which is powered by the internal combustion engine 1 or a part of a vehicle or machine which is powered by the engine 1. In some examples the motion sensor 29 may be configured to detect that the vehicle is accelerating or decelerating. This may then provide an indication that the engine 1 is accelerating or decelerating.

In response to the input signal received from the motion sensor 29, the controller 9 may be configured to send a control signal to the compressed gas valve 7. The control signal may cause the compressed gas valve 7 to be opened and closed in dependence upon the signal received from the motion sensor 29. For example, if the input signal received from the motion sensor 29 indicates that the engine 1 is decelerating then the control signal may cause the compressed gas valve 7 to be opened.

In some examples the controller 9 may also receive control signals from other parts of the internal combustion engine 1. For example, as mentioned above, the controller 9 may be configured to receive a control signal from the storage means 19 which indicates whether or not the storage means 19 is full. This can then be used to control whether or not the compressed gas valve 7 is opened or closed.

FIG. 2 illustrates an example combustion chamber 3 which may be used in an internal combustion engine 1 as illustrated in FIG. 1. Only features which are referred to in the following description are illustrated in FIG. 2. It is to be appreciated that other components may be included within the combustion chamber 3.

The example combustion chamber 3 comprises an inlet 15 and an inlet valve 5 and an exhaust outlet 17 and an exhaust valve 11 and also a compressed gas valve 7 as described above in relation to FIG. 1.

The example combustion chamber 3 of FIG. 2 also comprises a spark plug 31. The spark plug 31 may comprise any means which may be configured to ignite fuel within the combustion chamber 3. In the example of FIG. 2 the compressed gas valve 7 is provided within the spark plug 31. Having the compressed gas valve within the spark plug 31 may enable existing internal combustion engines 1 to be updated into engines according to the invention by updating and/or replacing the spark plug 31.

The combustion chamber 3 also comprises a piston 33 as illustrated in FIG. 2. The piston 33 is configured to move up and down as indicated by the arrow 35 during the combustion cycle of the engine 1. The movement of the piston 33 may then be used to power mechanical components such as driving the wheels of a motor vehicle.

When the piston 33 moves upward this may cause the compression of any gases within the combustion chamber 3. In some internal combustion engines 1 the piston 33 may continue to move even when the throttle 6 is closed. For example if a vehicle is braking or slowing down then the throttle 6 may be configured to prevent more fuel being provided into the combustion chamber 3 or to reduce the amount of fuel being provided into the combustion chamber 3. However the piston 33 may continue to move upwards which may cause compression of any gases within the combustion chamber 3 even though the engine is decelerating. In such situations the compressed gas valve 7 may be configured to be opened to enable the compressed gases to be extracted from the combustion chamber 3. Once extracted from the combustion chamber the compressed gases may be provided to power mechanical functions or may be stored in a storage means 19 or a secondary storage means 25 until they are needed to power the mechanical functions.

FIG. 3 illustrates an example method which may be used to control internal combustion engines 1 such as those described above with reference to FIGS. 1 and 2. The blocks of the method may, for example, be carried out by the controller 9.

At block 41 the controller 9 receives an input signal. In some examples the input signal may be received from the throttle position sensor 13. In such examples the input signal provides an indication of the position of the throttle 6. The control signal may enable the controller 9 to determine whether the throttle 6 is open or closed. In some examples the control signal may enable the controller 9 to determine that the throttle 6 is partially closed. The controller 9 may determine that the engine 1 is decelerating if the throttle 6 is closed or partially closed.

In some examples the input signal may be received from the motion sensor 29. In such examples the input signal may provide an indication of whether or not the engine 1 is decelerating.

If at block 41 it is determined that the engine 1 is not decelerating then at block 43 the compressed gas valve 7 is closed. If the engine is not decelerating then the throttle 6 may still be open so that fuel may be provided into the combustion chamber 3 and combustion may be taking place. At appropriate times within the combustion cycle the inlet valves 5 and exhaust valves 11 may be open and closed to enable efficient combustion of the fuel and extraction of the exhaust gases.

If at block 41 it is determined that the engine 1 is decelerating then at block 45 the compressed gas valve 7 is opened. If the engine 1 is decelerating the engine 1 may still be causing compression of gases within the combustion chamber 3 which is not needed to power the vehicle. The opening of the compressed gas valve 7 allows this compressed gas to be extracted and provided to power other mechanical functions.

In some examples the TPS 13 may be configured to provide a signal to the compressed gas valve 7 which may control the position of the compressed gas valve 7. The compressed gas valve 7 may be closed during the combustion process. In some examples the compressed gas valve 7 may be configured to open and shut in synchronisation with the cycles of the engine 1. For example, in a four stroke engine which may comprise a mechanically driven valve train the compressed gas valve 7 may be open and shut every engine cycle which may be once every two engine revolutions. The compressed gas valve 7 may be closed only if it has received a signal indicating that the throttle is closed or that the engine is decelerating.

The compressed gas which is recovered from the engine 1 may be used to drive any suitable function which may use compressed gas. For example, where the engine 1 is used in a vehicle such as a car or motorbike the compressed gas may be used to provide power for mechanisms such as alternators, power steering, braking systems or any other suitable mechanism. The compressed gas could also be used for powering pneumatic gearshifting systems which may include pneumatic throttle blippers and/or powering turbo chargers and/or diverting pneumatic power to drive wheels. In some examples the compressed gas could be diverted and used to improve aerodynamic efficiency of the vehicle. It is to be appreciated that the extracted compressed gas could be used in any suitable system. The compressed gas 7 may be used for any number of different applications within the same vehicle.

In some examples the controller 9 may be configured to receive an input signal indicating the capacity of the storage means 19 and/or the secondary storage means 25. If it is determined that the storage means 19 is full then the compressed gas valve 7 may be closed. The valve 7 could be reopened if some of the gas was extracted from the storage means 19. For example if the compressed gas was used to drive the braking system this may then create capacity within the storage means 19 and/or the secondary storage means 25.

The above described internal combustion engines 1 provide systems with improved efficiency. The internal combustion engine 1 may be configured to harness compressed gases which might otherwise not be used. The compressed gases can then be used to power other mechanical systems. This may make systems which use internal combustion engines 1, such as vehicles, more efficient. For example, the system may enable compressed gas to be made available for systems such as braking systems or for driving wheels. This may make the vehicle more efficient as a whole. In other examples the vehicle may already comprise systems which use compressed gases. In such examples obtaining the compressed gas from the engine 1 as described above, may increase the efficiency of the system because it reduces the need to compress the gas specifically for the system.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed. For example in the above described examples the compressed gas valve 7 is provided in a spark plug 31. It is to be appreciated that the compressed gas valve could be provided at any suitable location within the internal combustion engine, for example within the combustion chamber 3 within an exhaust port or within the exhaust pipe 17 or any other suitable location.

In some examples the controller 9 may control the engine 1 so that if the compressed gas valve 7 is open the exhaust valve 11 is closed. In some examples the exhaust valve 11 may be closed completely if the compressed gas valve 7 is open. This may be the case in examples where the exhaust valve 11 comprises a solenoid or pneumatically operated valve and no camshaft is provided. In some examples the opening sequence of the inlet valve 5 may be changed in response to a signal that the throttle 6 is closed and/or the engine is decelerating. The change for instance could be that the inlet valve 5 is opened and closed every engine revolution. This may cause a four stroke engine to effectively operate as a two stroke gas compressor once the throttle 6 is closed.

This may increase the pressure in the combustion chamber 3 and allow for more efficient compression of the gas. This may cause higher engine braking. In such examples additional valves such as butterfly valves or guillotine valves may be provided to enable compressed gas to be vented to the atmosphere. The additional valves may be controlled by any suitable mechanism such as a servo motor. This may control the braking of the engine and may prevent over-aggressive deceleration of the engine. In some examples the additional valves may be controlled by the TPS 13 or by the controller 9.

In the above described examples the internal combustion engine 1 comprises a four stroke combustion engine. It is to be appreciated that in other examples other types of combustion engine may be used such as a two stroke combustion engine.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An internal combustion engine comprising:
   a combustion chamber;
   a compressed gas valve wherein the compressed gas valve is arranged to enable compressed gas to be extracted from the internal combustion engine and used to provide power for mechanical functions comprising one or more of gear shifting systems, alternators, power steering, diverting pneumatic power to drive the wheels; and a controller, wherein the controller is configured to receive a signal indicative of a configuration of the internal combustion engine and cause the compressed gas valve to be opened in response to a signal indicating at least one of that the internal combustion engine is decelerating or the throttle is closed to enable compressed gas to be extracted from the internal combustion engine via the compressed gas valve.

2. An internal combustion engine as claimed in claim 1 comprising an inlet valve.

3. An internal combustion engine as claimed in claim 2 wherein the controller is configured to change the opening sequence of the inlet valve in response to the signal indicating at least one of that the internal combustion engine is decelerating or the throttle is closed.

4. An internal combustion engine as claimed in claim 1 further comprising an outlet valve configured to enable exhaust gases to be expelled from the combustion chamber.

5. An internal combustion engine as claimed in claim 1 wherein the compressed gas valve is configured to enable compressed gas to be extracted from the combustion chamber.

6. An internal combustion engine as claimed in claim 5 wherein the compressed gas valve is provided in a spark plug.

7. An internal combustion engine as claimed in claim 1 wherein the compressed gas valve is configured to enable compressed gas to be extracted from an exhaust outlet.

8. An internal combustion engine as claimed in claim 1 wherein the controller is configured to cause the compressed gas valve to be opened in response to a signal indicating that a throttle valve is closed.

9. An internal combustion engine as claimed in claim 1 wherein the controller is configured to cause the compressed gas valve to be opened in response to a signal indicating that a vehicle powered by the internal combustion engine is decelerating.

10. An internal combustion engine as claimed in claim 1 further comprising storage means configured to store the extracted compressed gas.

11. An internal combustion engine as claimed in claim 10 wherein the storage means comprises a relief valve.

12. An internal combustion engine as claimed in claim 10 wherein the controller is configured to cause the compressed gas valve to be closed in response to a signal indicating that the storage means is full.

13. An internal combustion engine as claimed in claim 1 wherein the configuration of the compressed gas valve is controlled using a solenoid.

14. An internal combustion engine as claimed in claim 1 wherein the configuration of the compressed gas valve is controlled using a pneumatic system.

15. An internal combustion engine as claimed in claim 1 wherein the configuration of the compressed gas valve is controlled using a servo motor.

16. An internal combustion engine system as claimed in claim 1 wherein the extracted compressed gas is used to power a gear shift system.

17. A combustion chamber for an internal combustion engine, the combustion chamber comprising:

a compressed gas valve wherein the compressed gas valve is arranged to enable compressed gas to be extracted from the internal combustion engine and used to provide power for mechanical functions comprising one or more of gear shifting systems, alternators, power steering, diverting pneumatic power to drive the wheels; and wherein the compressed gas valve is configured to be opened in response to a signal indicating at least one of that the internal combustion engine is decelerating or a throttle is closed.

* * * * *